(12) United States Patent
Lee

(10) Patent No.: US 11,782,644 B2
(45) Date of Patent: Oct. 10, 2023

(54) MEMORY SYSTEM AND METHOD OF OPERATING THE SAME

(71) Applicant: SK hynix Inc., Icheon (KR)

(72) Inventor: Jong Hwan Lee, Icheon (KR)

(73) Assignee: SK hynix Inc., Icheon (KR)

( * ) Notice: Subject to any disclaimer, the term of this patent is extended or adjusted under 35 U.S.C. 154(b) by 13 days.

(21) Appl. No.: 17/546,736

(22) Filed: Dec. 9, 2021

(65) Prior Publication Data

US 2023/0037172 A1 Feb. 2, 2023

(30) Foreign Application Priority Data

Jul. 30, 2021 (KR) .......................... 10-2021-0100886

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0656* (2013.01); *G06F 3/0673* (2013.01)

(58) Field of Classification Search
CPC .... G06F 3/0659; G06F 3/0604; G06F 3/0631; G06F 3/0656; G06F 3/0673
See application file for complete search history.

(56) References Cited

U.S. PATENT DOCUMENTS

| | | | |
|---|---|---|---|
| 2018/0033469 A1* | 2/2018 | Moritoki | G06F 11/1048 |
| 2018/0181300 A1* | 6/2018 | Barndt | G06F 11/079 |
| 2022/0050626 A1* | 2/2022 | Oh | G06F 3/0611 |
| 2022/0091932 A1* | 3/2022 | Kim | G06F 3/0679 |
| 2022/0229578 A1* | 7/2022 | Palmer | G06F 3/0679 |

FOREIGN PATENT DOCUMENTS

| KR | 10-2019-0051313 A | 5/2019 |
|---|---|---|
| KR | 10-2020-0015091 A | 2/2020 |

* cited by examiner

*Primary Examiner* — John A Lane

(57) ABSTRACT

A memory system may include a memory controller and a memory device including a plurality of sequential areas. The memory controller may control the performance of a background media scan (BGMS) operation on one or more sequential areas among the plurality of sequential areas. The memory controller may receive an open command for allocating a buffer to a sequential area among the plurality of sequential areas, where first time information corresponds to a time at which the open command is received by the memory controller. The memory controller may calculate a first period based on the first time information, and determine, based on the first period, a skip area in which the BGMS operation is skipped among the plurality of sequential areas for each of a plurality of BGMS periods.

20 Claims, 10 Drawing Sheets

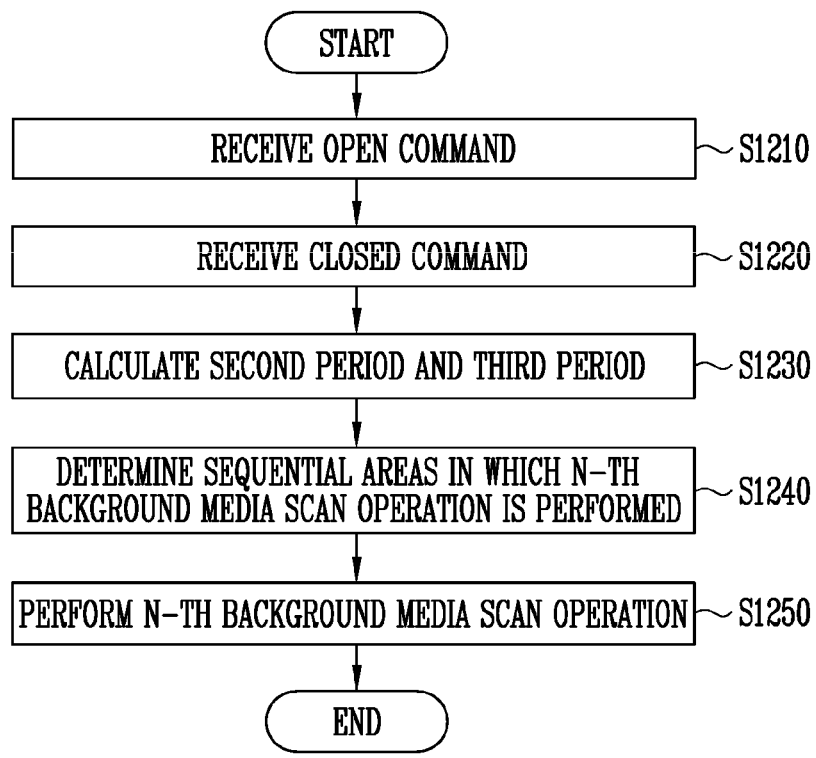
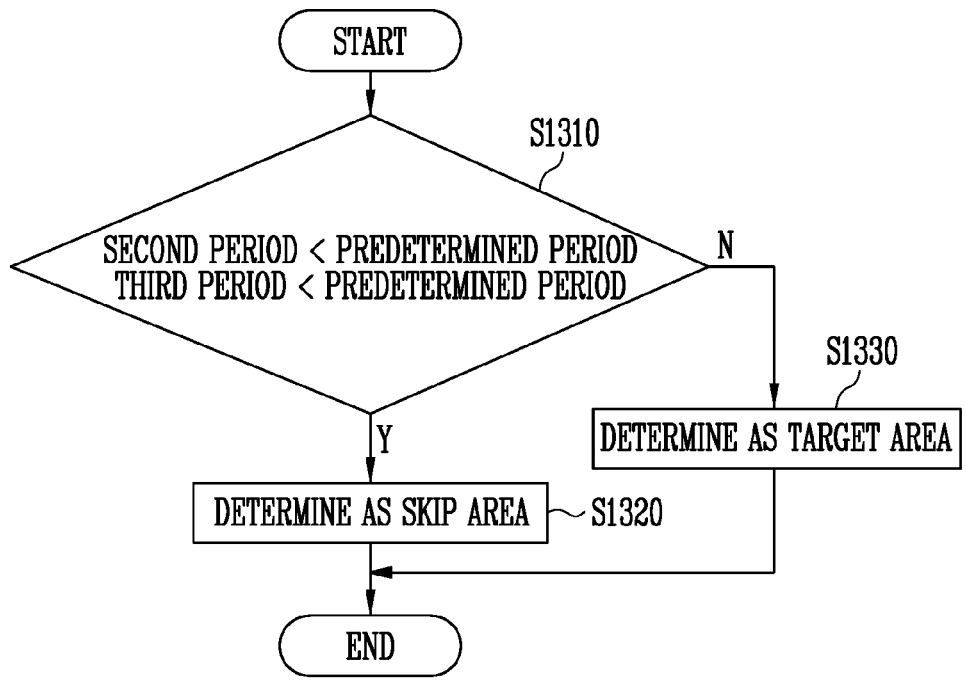

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2021-0100886, filed on Jul. 30, 2021, which is incorporated herein by reference in its entirety.

BACKGROUND

1. Field of Invention

The present disclosure relates to an electronic device, and more particularly, to a memory system and a method of operating the same.

2. Description of Related Art

A memory system is a device that stores data under control of a host device such as a computer or a smartphone. The memory system may include a memory device in which data is stored and a memory controller controlling the memory device. The memory device may be classified as a volatile memory device or a nonvolatile memory device.

The volatile memory device is a device that stores data only when power is supplied and loses the stored data when the power supply is cut off. Volatile memory devices include static random access memory (SRAM), dynamic random access memory (DRAM), and the like.

The nonvolatile memory device is a device that does not lose data even though power is cut off. Nonvolatile memory devices include read only memory (ROM), programmable ROM (PROM), electrically programmable ROM (EPROM), electrically erasable and programmable ROM (EEPROM), flash memory, and the like.

SUMMARY

An embodiment of the present disclosure provides a memory system that performs a background media scan operation and a method of operating the same.

According to an embodiment of the present disclosure, a memory system may include a memory device including a plurality of sequential areas in which data corresponding to consecutive logical addresses provided by a host are respectively stored, and configured to perform a background media scan (BGMS) operation on one or more sequential areas among the plurality of sequential areas during one or more BGMS operation periods each having a predetermined period, and a memory controller configured to receive from the host an open command for allocating a buffer to a sequential area among the plurality of sequential areas, wherein first time information corresponds to a time point when the open command is received by the memory controller, calculate, based on the first time information, a first period which is a period between the time point when the open command is received and a time point when a BGMS operation period begins, and determine, based on the first period, a skip area from among the plurality of sequential areas, the skip area being a sequential area for which the BGMS operation is skipped during the BGMS operation period.

According to an embodiment of the present disclosure, a memory system may include a memory device including a plurality of sequential areas in which data corresponding to consecutive logical addresses provided by a host are stored, respectively, and configured to selectively perform a background media scan (BGMS) operation on the plurality of sequential areas during one to more BGMS operation periods each having a predetermined period, and a memory controller configured to receive an open command for allocating a buffer to a sequential area among the plurality of sequential areas from the host, wherein first time information corresponds to a time at which the open command is received by the memory controller, calculate, based on the first time information, a first period which is a period between a time point when the open command is received and a time point when an N-th BGMS operation period begins, where N is greater than or equal to 1, and determine, based on the first period, whether to perform a BGMS operation on a sequential area corresponding to the open command during the N-th BGMS operation period.

According to an embodiment of the present disclosure, a method of operating a memory system including a memory device including a plurality of sequential areas in which data corresponding to consecutive logical addresses are respectively stored, and a memory controller configured to control the memory device to selectively perform a background media scan (BGMS) operation on the plurality of sequential areas for each of a plurality of BGMS periods each having a predetermined period may include receiving an open command for allocating a buffer to a sequential area among the plurality of sequential areas, wherein first time information corresponds to a time at which the open command is received, calculating, based on the first time information, a first period which is a period between a time point when the open command is received and a time point corresponding to a start of an N-th BGMS period, where N is greater than or equal to 1, determining, based on the first period, one or more sequential areas on which BGMS operations are to be performed during the N-th BGMS period from among the plurality of sequential areas, and performing BGMS operations on the determined one or more sequential areas during the N-th BGMS period.

According to the present technology, a memory system in which a frequency of performance of a background media scan operation is reduced, and a method of operating the same may be provided.

BRIEF DESCRIPTION OF THE DRAWINGS

FIG. 12 is a flowchart illustrating a process for performing a BGMS operation according to another embodiment of the present disclosure.

FIG. 13 is a flowchart illustrating a process for determining a sequential area in which a BGMS operation is performed according to another embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
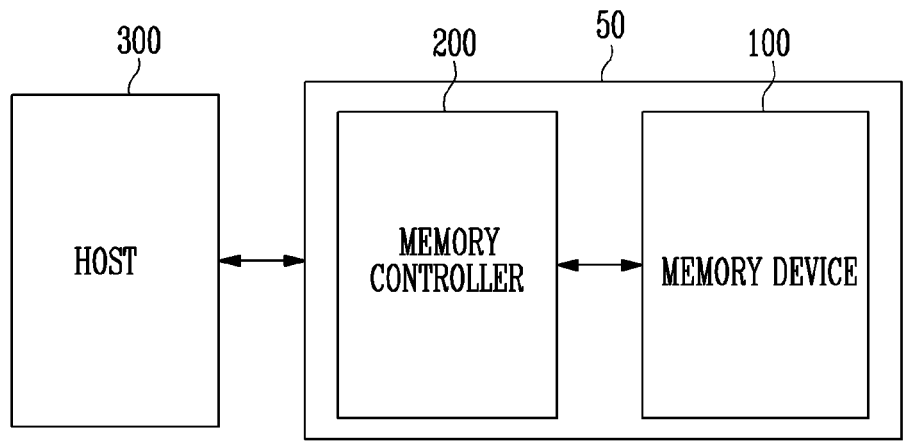
FIG. 1 illustrates a memory system including a memory device according to an embodiment of the present disclosure.

FIG. 1 illustrates a memory system 50 including a memory device according to an embodiment of the present disclosure.

The memory system 50 may include a memory device 100 and a memory controller 200 that controls an operation of the memory device. The memory system 50 may be a device that stores data under control of a host 300 such as a cellular phone, a smartphone, an MP3 player, a laptop computer, a desktop computer, a game player, a TV, a tablet PC, or an in-vehicle infotainment system.

The memory system 50 may be manufactured as one of various types of memory systems according to a host interface that provides communication with the host 300. For example, the memory system 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The memory system 50 may be manufactured as any one of various types of packages. For example, the memory system 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. Each memory block may include a plurality of memory cells. One memory block may include a plurality of pages. In an embodiment, the page may be a unit for storing data in the memory device 100 or for reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 may be configured to receive a command and an address from the memory controller 200 and access an area selected by the address in the memory cell array. The memory device 100 may perform an operation instructed by the command on the area selected by the address. For example, the memory device 100 may perform a program operation, a read operation, and an erase operation. During the program operation, the memory device 100 may store data in the area selected by the address. During the read operation, the memory device 100 may read data from the area selected by the address. During the erase operation, the memory device 100 may erase data stored in the area selected by the address.

The memory device 100 may include a plurality of planes. The plane may be a unit capable of independently performing an operation. For example, the memory device 100 may include two, four, or eight planes. The plurality of planes may independently perform each of the program operation, the read operation, or the erase operation, simultaneously.

The memory device 100 may include a sequential area. The sequential area may be an area in which logical block addresses (LBAs) are consecutive. The memory controller 200 may perform the write operation to store data in the sequential area. The LBAs of data stored in the sequential area may be consecutive. The memory device 100 may include a plurality of sequential areas of different sizes. The memory device 100 may be partitioned to have a sequential area unit and used.

The plurality of sequential areas may include an active area in which the write operation is possible in the sequential area and an inactive area in which the write operation is impossible in the sequential area. The active area may include an open area to which a sequential buffer is allocated and a closed area to which the sequential buffer is not allocated. The sequential buffer may be a buffer memory that stores data to be stored in the sequential area. The inactive area may include an empty area in which data is not stored in the sequential area and a full area in which data is stored in the sequential area.

In an embodiment, the memory device 100 may perform a background media scan (BGMS) operation. The BGMS operation may be performed in an idle time when a command received from the memory controller 200 is not being performed. The background media scan BGMS operation may be performed to prevent read failures, that is, the occurrence of uncorrectable error correction codes (UECCs) for read data during the read operation, in advance.

For example, the memory device 100 may scan (read) data stored in the memory cells in the idle time. The memory device 100 may select a page on which the read operation is highly likely to fail based on a scan result and perform a refresh operation. At this time, the memory device 100 may scan data sequentially according to a memory block number or according to a random memory block number.

During the BGMS, the memory device 100 may detect a page that may potentially produce UECCs by scanning data stored in the page. The memory device 100 may then prevent the UECC in advance by programming data of the detected page into another memory block. The memory device 100 may improve data reliability by detecting a page that may potentially produce UECC due to read disturb and retention.

The memory controller 200 may receive an explicit open command to explicitly convert the sequential area to the open area from the host 300. The memory controller 200 may allocate the sequential buffer to the sequential area corresponding to the explicit open command. The memory controller 200 may sequentially store data received from the host 300 in the sequential area to which the sequential buffer is allocated.

The memory controller 200 may receive only identification information for the sequential area and a command instructing the write operation without the explicit open command from the host 300. In response, the memory controller 200 may allocate the sequential buffer to the sequential area corresponding to the received identification information. The memory controller 200 may then sequentially store data received from the host 300 in the sequential area to which the sequential buffer is allocated.

The memory controller 200 may receive a command to convert the open area to the closed area from the host 300. Data may not be stored in the sequential area converted to the closed area. When the sequential buffer to be allocated to the sequential area is insufficient, the memory controller 200 may select at least one open area from among the open areas to convert the selected open area to the closed area.

The memory controller 200 may control an overall operation of the memory system 50.

When power is applied to the memory system 50, the memory controller 200 may execute firmware (FW). When the memory device 100 is a flash memory device, the firmware (FW) may include a host interface layer (HIL) that controls communication with the host 300, and the memory controller 200 may include a flash translation layer (FTL) that controls communication between the host 300 and the memory device 100, and a flash interface layer (FIL) that controls communication with the memory device 100.

The memory controller 200 may receive write data and an LBA from the host 300 and may convert the LBA into a physical block address (PBA) indicating an address of memory cells in which data included in the memory device 100 is to be stored. In the present specification, the LBA and a "logic address" or a "logical address" may be used as the same meaning. In the present specification, the PBA and a "physical address" may be used as the same meaning.

The memory controller 200 may control the memory device 100 to perform the program operation, the read operation, the erase operation, or the like according to a request of the host 300. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 300 and transmit the command, the address, and the data to the memory device 100. For example, the memory controller 200 may provide the command, the address, and the data for performing a read operation and program operations accompanying in performing wear leveling, read reclaim, garbage collection, and the like, to the memory device 100.

In an embodiment, the memory controller 200 may control at least two or more memory devices 100. In this case, the memory controller 200 may control the memory devices 100 according to an interleaving technology to improve operation performance. The interleaving technology may be a technology for controlling respective operations for at least two memory devices 100 so that the operations overlap with each other. Alternatively, the interleaving technology may be a technology in which at least two or more memory devices 100 operate in parallel.

A buffer memory (not shown) may temporarily store data provided from the host 300, that is, data to be stored in the memory device 100, or may temporarily store data read from the memory device 100. In an embodiment, the buffer memory may be a volatile memory device. For example, the buffer memory may be a dynamic random access memory (DRAM) or a static random access memory (SRAM).

The host 300 may communicate with the memory system 50 using at least one of various communication technologies such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
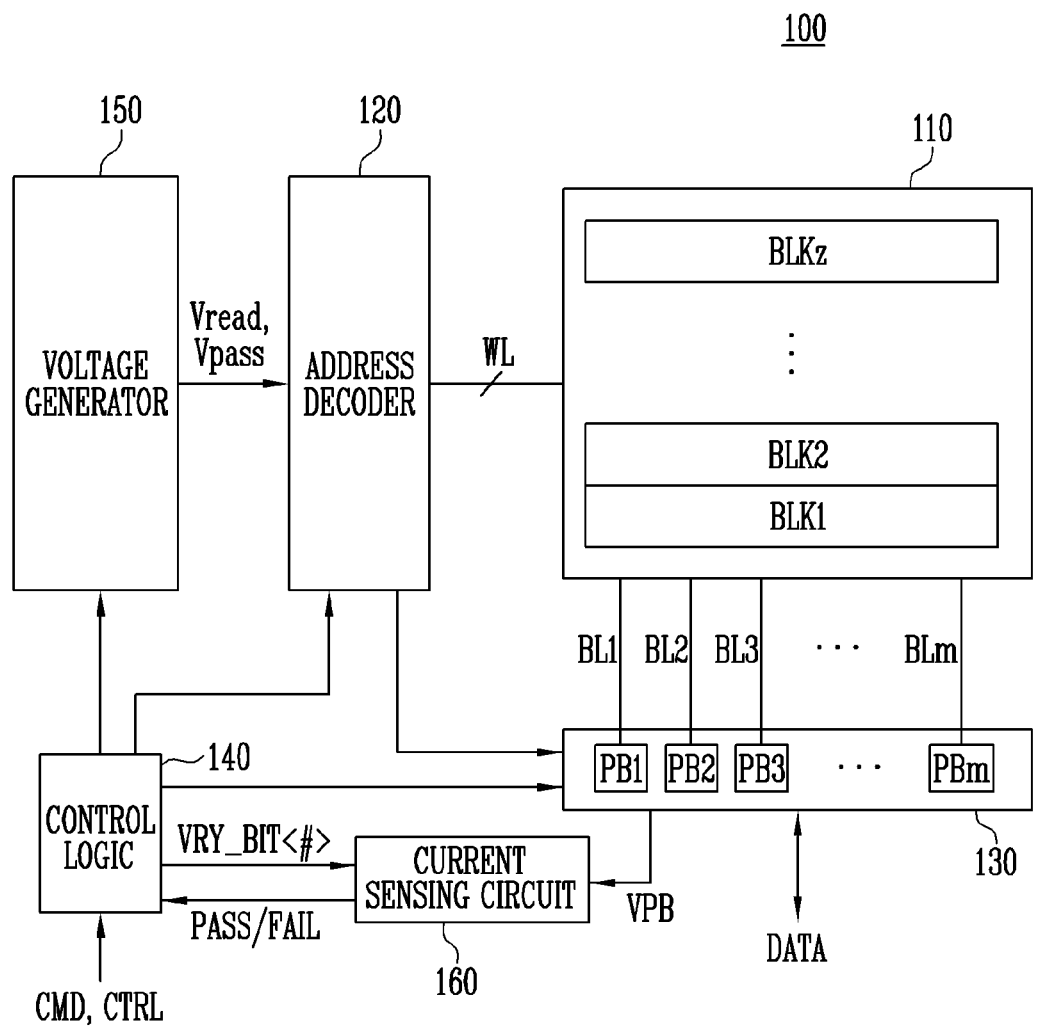
FIG. 2 illustrates the memory device of FIG. 1.

FIG. 2 is a diagram illustrating the memory device of FIG. 1.

Referring to FIG. 2, the memory device 100 may include a memory cell array 110, an address decoder 120, a read and write circuit 130, a control logic 140, a voltage generator 150, and a current sensing circuit 160. The address decoder 120, the read and write circuit 130, the voltage generator 150, and the current sensing circuit 160 may be referred to as a peripheral circuit controlled by the control logic 140.

The memory cell array 110 may include a plurality of memory blocks BLK1 to BLKz. The plurality of memory blocks BLK1 to BLKz may be connected to the address decoder 120 through word lines WL. The plurality of memory blocks BLK1 to BLKz may be connected to the read and write circuit 130 through bit lines BL1 to BLm. Each of the plurality of memory blocks BLK1 to BLKz may include a plurality of memory cells. As an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Meanwhile, each of the plurality of memory cells included in the memory cell array may store at least one bit of data. In an embodiment, each of the plurality of memory cells included in the memory cell array 110 may be an SLC storing one bit of data. In another embodiment, each of the plurality of memory cells included in the memory cell array 110 may be an MLC storing two bits of data. In still another embodiment, each of the plurality of memory cells included in the memory cell array 110 may be a TLC storing three bits of data. In still another embodiment, each of the plurality of memory cells included in the memory cell array 110 may be a QLC storing four bits of data. According to an embodiment, the memory cell array 110 may include a plurality of memory cells each storing five or more bits of data.

The address decoder 120 may be connected to the memory cell array 110 through the word lines WL. The address decoder 120 may be configured to operate in response to control of the control logic 140. The address decoder 120 may receive an address through an input/output buffer (not shown) inside the memory device 100.

The address decoder 120 may be configured to decode a block address among received addresses. The address decoder 120 may select at least one memory block according to the decoded block address. In addition, the address decoder 120 may apply a read voltage Vread generated in the voltage generator 150 to a selected word line of the selected memory block at a time of a read voltage application operation during a read operation, and apply a pass voltage Vpass to the remaining unselected word lines. In addition, during a program verify operation, the address decoder 120 may apply a verify voltage generated in the voltage generator 150 to the selected word line of the selected memory block, and apply the pass voltage Vpass to the remaining unselected word lines.

The address decoder 120 may be configured to decode a column address of the received addresses. The address decoder 120 may transmit the decoded column address to the read and write circuit 130.

The read operation and the program operation of the memory device 100 may be performed in a page unit. Addresses received at a time of a request of the read operation and the program operation may include a block address, a row address, and a column address. The address decoder 120 may select one memory block and one word line according to the block address and the row address. The column address may be decoded by the address decoder 120 and may be provided to the read and write circuit 130. In the present specification, memory cells connected to one word line may be referred to as a "physical page".

The read and write circuit 130 may include a plurality of page buffers PB1 to PBm. The read and write circuit 130 may operate as a "read circuit" during the read operation of the memory cell array 110 and may operate as a "write circuit" during the write operation of the memory cell array 110. The plurality of page buffers PB1 to PBm may be connected to the memory cell array 110 through the bit lines BL1 to BLm. During the read operation and the program verify operation, in order to sense a threshold voltage of the memory cells, the plurality of page buffers PB1 to PBm may sense a change of an amount of a current flowing according to a programmed state of a corresponding memory cell through a sensing node while simultaneously supplying a sensing current to the bit lines connected to the memory cells, and may latch the sensed change as sensing data. The read and write circuit 130 may operate in response to page buffer control signals output from the control logic 140. In the present specification, the write operation of the write circuit may be used as the same meaning as the program operation on the selected memory cells.

During the read operation, the read and write circuit 130 may sense data of the memory cell, temporarily store read data, and output data to an input/output buffer (not shown) of the memory device 100. As an illustrative embodiment, the read and write circuit 130 may include a column select circuit, and the like, in addition to the page buffers (or page registers). The read and write circuit 130 may be a page buffer according to an embodiment of the present disclosure.

The control logic 140 may be connected to the address decoder 120, the read and write circuit 130, the voltage generator 150, and the current sensing circuit 160. The control logic 140 may receive the command CMD and a control signal CTRL through the input/output buffer (not shown) of the memory device 100. The control logic 140 may be configured to control overall operations of the memory device 100 in response to the control signal CTRL. In addition, the control logic 140 outputs a control signal for adjusting a sensing node pre-charge potential level of the plurality of page buffers PB1 to PBm. The control logic 140 may control the read and write circuit 130 to perform the read operation of the memory cell array 110.

Meanwhile, the control logic 140 may determine whether a verify operation on a specific target program state is passed or failed in response to a pass signal PASS or a fail signal FAIL received from the current sensing circuit 160.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage. The voltage generator 150 may generate the plurality of voltages by selectively activating the plurality of pumping capacitors in response to the control of the control logic 140.

The current sensing circuit 160 may generate a reference current and a reference voltage in response to a permission bit VRY_BTI<#> received from the control logic 140 during a verify operation. A pass signal PASS or a fail signal FAIL may be output by comparing the generated reference voltage with a sensing voltage VPB received from the page buffers PB1 to PBm included in the read and write circuit 130 or comparing the generated reference current with a sensing current received from the page buffers PB1 to PBm included in the read and write circuit 130.

The address decoder 120, the read and write circuit 130, the voltage generator 150, and the current sensing circuit 160 may function as the "peripheral circuit" that performs the read operation, the write operation, and the erase operation on the memory cell array 110. The peripheral circuit may perform the read operation, the write operation, and the erase operation on the memory cell array 110 based on the control of the control logic 140.

Figure 3:
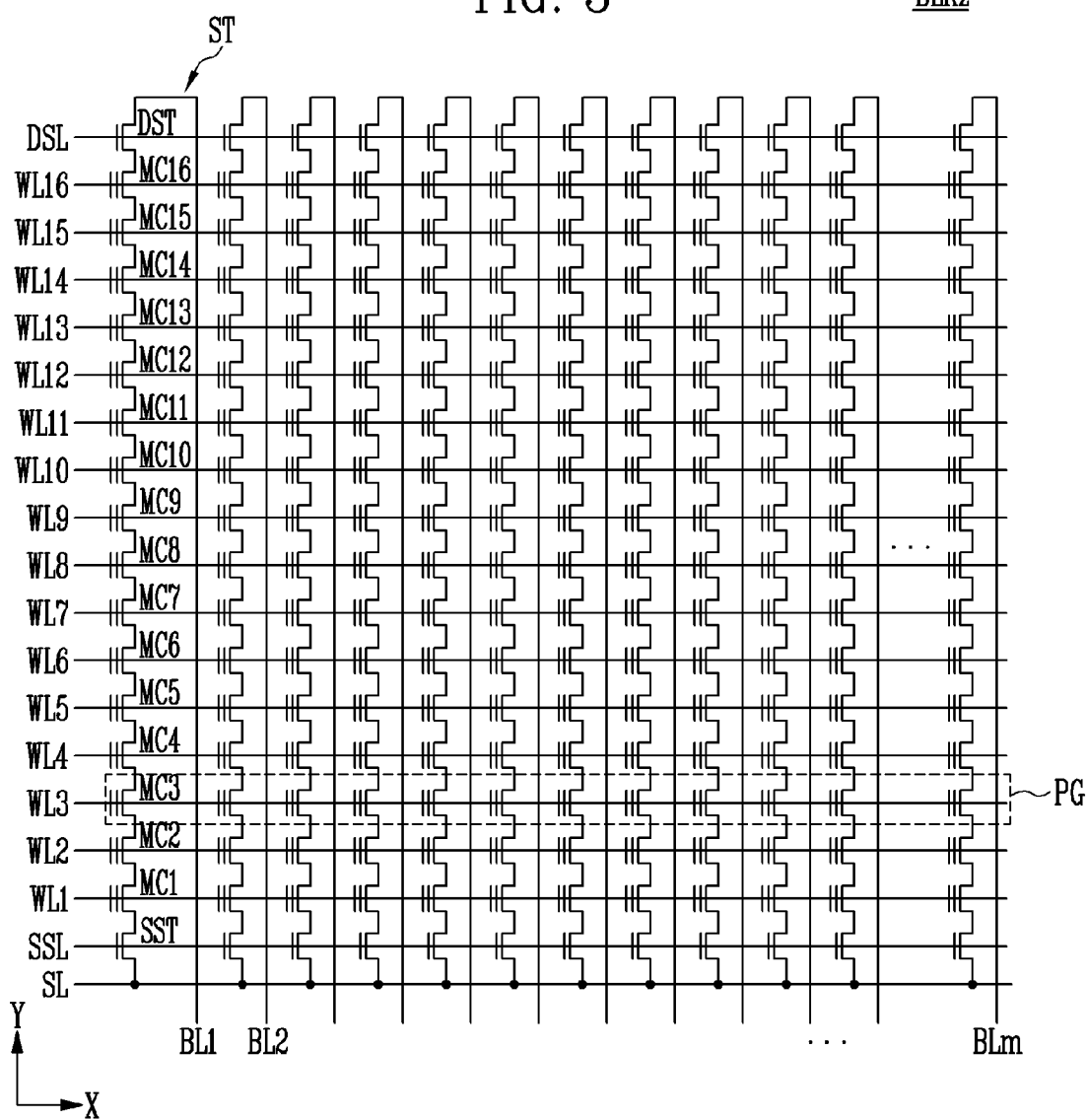
FIG. 3 illustrates a configuration of any one of memory blocks of FIG. 2.

FIG. 3 is a diagram illustrating a configuration of any one of the memory blocks of FIG. 2.

The memory block BLKz is any one memory block BLKz among the memory blocks BLK1 to BLKz of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKz may include a plurality of strings ST connected between the bit lines BL1 to BLm and the source line SL. The bit lines BL1 to BLm may be connected to the strings ST, respectively, and the source line SL may be commonly connected to the strings ST. Since the strings ST may be configured identically to each other, a string connected to the first bit line BL1 is specifically described as an example.

The string may include a source select transistor SST, a plurality of memory cells MC1 to MC16, and a drain select transistor DST connected in series between the source line SL and the first bit line BL1. One string may include one or more of the source select transistor SST and the drain select transistor DST, and may include memory cells more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKz may include the pages PG of the number of the word lines WL1 to WL16.

One memory cell may store one bit of data. This is commonly called an SLC. In this case, one physical page PG may store one logical page (LPG) data. The one logical page (LPG) data may include data bits of the same number as cells included in one physical page PG.

The one memory cell may store two or more bits of data. In this case, one physical page PG may store two or more logical page (LPG) data.

Figure 4:
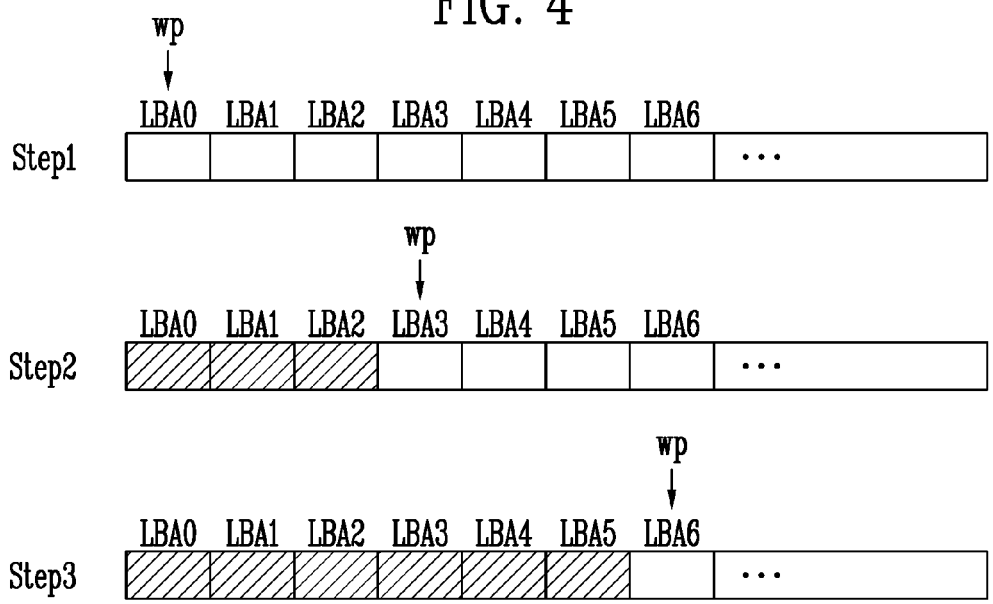
FIG. 4 illustrates a write operation performed on a sequential area.

FIG. 4 is a diagram illustrating a write operation performed on a sequential area.

Referring to FIG. 4, a plurality of pages may be included in the sequential area. The plurality of pages may consist of pages with consecutive physical addresses. Logical addresses allocated to neighboring pages may be consecutive. The memory controller may perform a write operation of storing data provided from the host in each of a plurality of pages included in the sequential area. The logical addresses of the stored data may be consecutive. The stored data may be stored in the sequential buffer before the stored data is stored in the sequential area.

A write pointer wp may indicate one logical address among logical addresses LBA0, LBA1, LBA2, LBA3, LBA4, LBA5, LBA6, and the like at which data is to be stored in the sequential area. Information on the logical address indicated by the write pointer wp may be referred to as write pointer information. The memory controller may store data in a page corresponding to the logical address indicated by the write pointer wp. A page in which data is stored may be shown as a hatched space, and a page in which data is not stored may be shown as an empty space. The sequential area may be the open area. Whenever the memory controller performs the write operation, the logical address indicated by the write pointer wp may be increased.

Step 1 Step1 may indicate a sequential area in which data is not stored. Since the memory controller stores data in the sequential area beginning with data corresponding to the logical address 0 LBA0, the write pointer wp may indicate a physical location in which to store data corresponding to a logical address 0 LBA0. In an embodiment, at Step 1 the write pointer wp may indicate a first physical address in the sequential area, or a first physical address after a header of the sequential area if such a header is present.

Step 2 Step2 may indicate a sequential area in which data is stored in a page corresponding to logical addresses 0 to 2 LBA0 to LBA2. When data is stored in the logical address 2 LBA2, the write pointer wp may indicate a physical location in which to store data corresponding to the logical address 3 LBA3, which is a next logical address.

Step 3 Step3 may indicate a sequential area in which data is stored in a page corresponding to logical addresses 0 to 5 LBA0 to LBA5. The memory controller may sequentially store data in the sequential area indicated by the write pointer wp from the logical address 3 LBA3. When data is stored up to the logical address number 5 LBA5, the write pointer wp may indicate a physical location in which to store data corresponding to the logical address 6 LBA6.

Also after step 3 Step3, data may be sequentially stored according to a logical address indicated by the write pointer wp according to the command received from the host. Step 1 Step1, step 2 Step2, and step 3 Step3 may be sequentially performed. As the write operation proceeds (Step1, Step2, and Step3), data may be sequentially stored in the sequential area.

Figure 5:
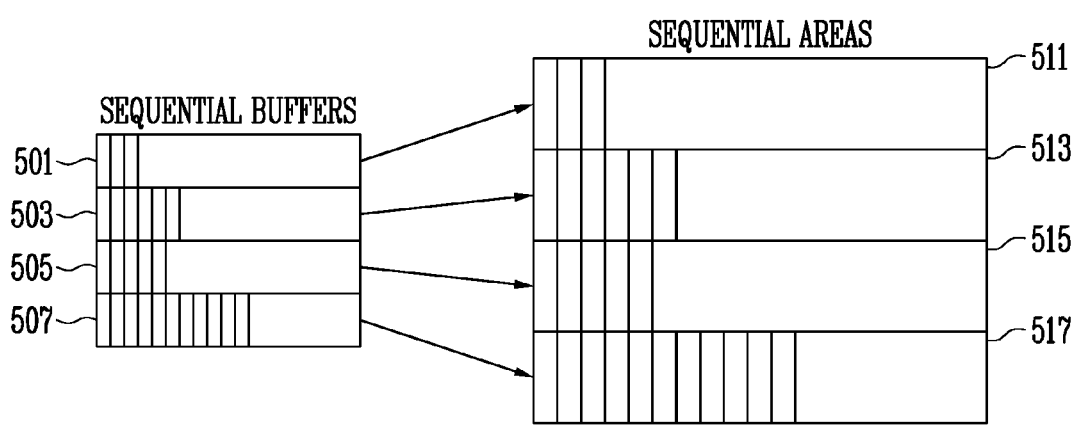
FIG. 5 illustrates an operation in which data stored in a plurality of sequential buffers is stored in each of a plurality of sequential areas.

FIG. 5 is a diagram illustrating an operation in which data stored in a plurality of sequential buffers is stored in each of a plurality of sequential areas.

Referring to FIG. 5, data stored in the plurality of sequential buffers may be stored in the plurality of sequential areas. The memory controller may allocate the sequential buffer necessary for the write operation to the sequential area. In FIG. 5, for convenience of description, each of the number of sequential areas and sequential buffers is four, but the number of sequential areas and sequential buffers is not limited thereto. The plurality of sequential buffers 501, 503, 505, and 507 may correspond to the plurality of sequential areas 511, 513, 515 and 517, respectively.

For example, the sequential buffer 501 may correspond to the sequential area 511, and the sequential buffer 503 may correspond to the sequential area 513. The sequential buffer 505 may correspond to the sequential area 515, and the sequential buffer 507 may correspond to the sequential area 517. Data corresponding to the consecutive logical addresses provided from the host may be stored in the sequential buffers 501, 503, 505, and 507, respectively. An operation in which the data stored in the sequential buffer is sequentially stored in the sequential area may correspond to the description of FIG. 4.

The data stored in the sequential buffer may be stored in the sequential area only when the data satisfies an optimal write size (OWS) of the sequential area, which is a minimum size unit of programmable data. For example, the OWS may be 96 Kb or 192 Kb.

FIG. 5 may illustrate sequence areas of which the OWSs are different. For example, in the sequential area 511, the OWS may correspond to a size of data stored in three logical addresses (respectively corresponding to three pages), and in the sequential area 513, the OWS may correspond to a size of data stored in six logical addresses. In the sequential area 515, the OWS may correspond to a size of data stored in five logical addresses, and in the sequential area 517, the OWS may correspond to a size of data stored in eleven logical addresses. Since the sequential buffers 501, 503, 505, and 507 store data greater than or equal to the OWS for each of the sequential areas 511, 513, 515, and 517, the memory controller may store the data stored in the sequential buffers 501, 503, 505, and 507 in the sequential areas 511, 513, 515, and 517.

The memory controller may store the data stored in the sequential buffer 501 to correspond to the logical address 0, the logical address 1, and the logical address 2 of the sequential area 511. The memory controller may store the data stored in the sequential buffer 503 to correspond to the logical address 0, the logical address 1, the logical address 2, the logical address 3, the logical address 4, and the logical address 5 of the sequential area 513. The memory controller may store the data stored in the sequential buffer 505 to correspond to the logical address 0, the logical address 1, the logical address 2, the logical address 3, and the logical address 4 of the sequential area 515. The memory controller may store the data stored in the sequential buffer 507 to correspond to the logical address 0, the logical address 1, the logical address 2, the logical address 3, the logical address 4, the logical address 5, the logical address 6, the logical address 7, the logical address 8, the logical address 9, and the logical address 10 of the sequential area 517.

Figure 6:
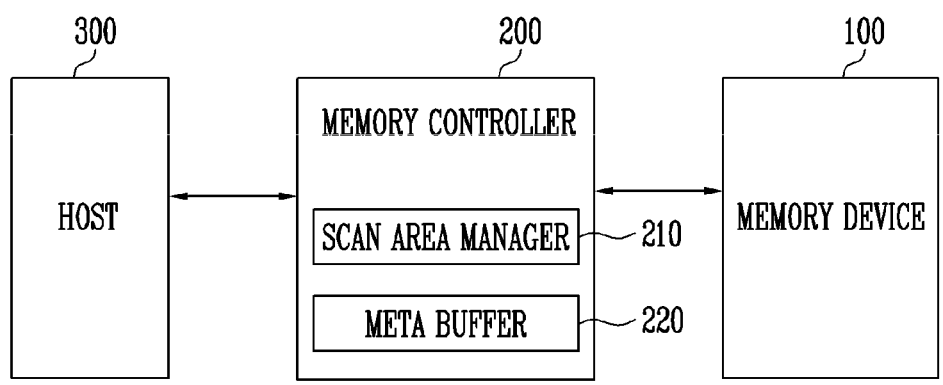
FIG. 6 is a block diagram illustrating a process for performing a background media scan (BGMS) operation according to an embodiment of the present disclosure.

FIG. 6 is a block diagram illustrating a process for performing a background media scan operation according to an embodiment of the present disclosure.

Referring to FIG. 6, the memory controller 200 may be connected to the memory device 100 implemented as a nonvolatile memory, and may access the memory device 100. For example, the memory controller 200 may control read, write, erase, and background operations, and the like of the memory device 100. The memory controller 200 may provide an interface between the memory device 100 and the host 300. The memory controller 200 may execute firmware for controlling the memory device 100.

In an embodiment, the memory device 100 may include sequential areas having respective sizes that are different from each other. The sequential areas may each include a plurality of physical blocks. Data may be stored in each of the sequential areas, and consecutive logical addresses may be allocated to each of the sequential areas.

The memory device 100 may include the plurality of sequential areas in which data corresponding to the consecutive logical addresses provided by the host 300 are respectively stored. The memory device 100 may perform the BGMS operation on one or more sequential area among the plurality of sequential areas during each predetermined period.

The memory controller 200 may receive the open command for allocating a buffer to any one sequential area among the plurality of sequential areas from the host 300. The open command may include first time information corresponding to a time at which the open command is received by the memory controller 200. The first time information may be stored at a predetermined position of a signal transmitting the open command. In another embodiment, the first time information may be determined when the open command is received using a clock signal inside the memory controller 200.

The memory controller 200 may calculate, based on the first time information, a first period which is a period between a time point when the open command is received and a time point when the BGMS operation is scheduled to be performed. The memory controller 200 may determine a skip area among the plurality of sequential areas for which the BGMS operation will be skipped for each period of the BGMS operation based on the first period.

In an embodiment of the present disclosure, the memory controller 200 may further include a scan area manager 210 and a meta buffer 220.

The scan area manager 210 may determine a sequential area corresponding to the open command among the plurality of sequential areas as the skip area in response to the first period being less than the period in which the BGMS is performed. The scan area manager 210 may determine the sequential area corresponding to the open command as a target area in which the BGMS operation is performed in response to the first period being greater than or equal to the period in which the BGMS is performed.

In an embodiment of the present disclosure, the memory controller 200 may receive a closed command for releasing the buffer allocated to any one sequential area from the host 300. The closed command may include second time information corresponding to a time at which the closed command is received by the memory controller 200. The second time information may be stored at a predetermined position of a signal transmitting the closed command. In another embodiment, the second time information may be determined when the closed command is received using a clock signal inside the memory controller 200.

The scan area manager 210 may calculate, based on the second time information, a second period which is a period between a time point when the closed command is received and the time point when the BGMS operation is scheduled to be performed. The scan area manager 210 may calculate, based on the first time information and the second time information, a third period which is a period between the time point when the open command is received and the time point when the closed command is received. In embodiments, the open command and the closed command for which the third period is calculated correspond to the same sequential area. The scan area manager 210 may determine the skip area in which the BGMS operation is skipped among the plurality of sequential areas for each period of the BGMS operation based on the second period, the third period, and the period of the BGMS operation.

The scan area manager 210 may determine a sequential area corresponding to the closed command among the plurality of sequential areas as the skip area in response to the second period and the third period being less than the period of the BGMS operation. The scan area manager 210 may determine the sequential area corresponding to the closed command as the target area in response to the second period or the third period being greater than or equal to the period of the BGMS operation.

The meta buffer 220 may store the first time information and the second time information. The memory controller 200 may determine the skip area in which the BGMS operation is skipped among the plurality of sequential areas for each period of the BGMS operation based on the first time information and the second time information stored in the meta buffer 220.

In another embodiment of the present disclosure, the memory device 100 may include the plurality of sequential areas in which the data corresponding to the consecutive logical addresses provided by the host 300 are respectively stored. The memory device 100 may selectively perform the BGMS operation on the plurality of sequential areas for each predetermined period.

The memory controller 200 may receive an open command for allocating a buffer to any one sequential area among the plurality of sequential areas from the host 300. The open command may include first time information corresponding to a time at which the open command is received by the memory controller 200. The first time information may be stored at a predetermined position of a signal transmitting the open command.

The memory controller 200 may calculate a first period which is a period between the time point when the open command is received and a time point when an N-th BGMS operation is scheduled to be performed, based on the first time information, wherein N is greater than or equal to 1. The memory controller 200 may determine whether to perform the N-th BGMS operation on the sequential area corresponding to the open command based on the first period.

The scan area manager 210 may determine a sequential area corresponding to the open command as a skip area in which the N-th BGMS operation is skipped in response to the first period being less than the period in which the BGMS is performed. The scan area manager 210 may determine the sequential area corresponding to the open command as a target area in which the N-th BGMS operation is performed in response to the first period being greater than or equal to the period in which the BGMS is performed.

In another embodiment of the present disclosure, the memory controller 200 may receive a closed command for releasing the buffer allocated to any one sequential area from the host 300. The closed command may include second time information corresponding to a time at which the closed command is received by the memory controller 200. The second time information may be stored at a predetermined position of a signal transmitting the closed command.

The scan area manager 210 may calculate a second period which is a period between the time point when the closed command is received and the time point when the N-th BGMS operation is scheduled to be performed, based on the second time information. The scan area manager 210 may calculate a third period which is a period between the time point when the open command is received and the time point when the closed command is received, based on the first time information and the second time information. In embodiments, the open command and the closed command for which the third period is calculated correspond to the same sequential area. The scan area manager 210 may determine whether to perform the N-th BGMS operation on the sequential area corresponding to the closed command based on the second period, the third period, and the period of the BGMS operation.

The scan area manager 210 may determine the sequential area corresponding to the closed command as the skip area in which the N-th BGMS operation is skipped in response to the second period and the third period both being less than the period of the BGMS operation. The scan area manager 210 may determine the sequential area corresponding to the closed command as the target area in response to either of the second period or the third period being greater than or equal to the period of the BGMS operation.

The meta buffer 220 may store the first time information and the second time information. The memory controller 200 may determine whether to perform the N-th BGMS operation on the sequential area corresponding to the open command or the sequential area corresponding to the closed command based on the first time information and the second time information stored in the meta buffer 220.

Figure 7:
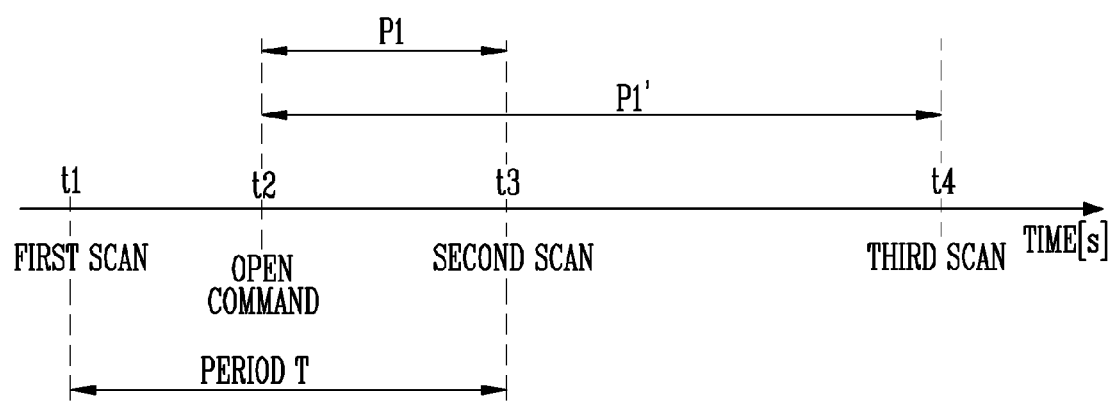
FIG. 7 illustrates a process for performing a BGMS operation after reception of an open command according to an embodiment of the present disclosure.

FIG. 7 is a diagram illustrating a process for performing a BGMS operation after reception of an open command according to an embodiment of the present disclosure.

Referring to FIG. 7, the BGMS operation may be scheduled to be performed for each predetermined period T. A first scan operation may be performed at a time t1. The open command may be received at a time t2. A second scan operation may be performed at a time t3. A third scan operation may be performed at a time t4.

In FIG. 7, for convenience of description, the BGMS operation is performed up to the third scan operation, but the embodiment of the present disclosure is not limited thereto. That is, the BGMS operation may be performed a plurality of times for each period T.

At the time point t1, since a received open command does not exist, the memory device 100 may perform the BGMS operation (the first scan operation) on the plurality of sequential areas included in the memory device 100. A case where the memory controller 200 receives the open command between the first scan operation and the second scan operation is illustrated. The second scan operation and the third scan operation are therefore BGMS operations performed after the memory controller 200 receives the open command.

At the time point t3, the memory controller 200 may calculate a first period P1 which is a period between the time point t2 and the time point t3. The memory controller 200 may calculate the first period P1 using a clock signal inside the memory controller 200.

The scan area manager 210 may compare the first period P1 with the period T of the BGMS operation. The scan area manager 210 may determine the sequential area corresponding to the open command among the plurality of sequential areas as the skip area in response to the first period P1 being shorter than the period T of the BGMS operation. That is, the BGMS operation may not be performed on the sequential area corresponding to the open command received at the time point t2 when the second scan operation is performed at the time point t3.

At the time point t4, the memory controller 200 may calculate a first period P1' which is a period between the time point t2 and the time point t4. The scan area manager 210 may compare the first period P1' with the period T of the BGMS operation. The scan area manager 210 may determine the sequential area corresponding to the open command as a target area of the BGMS operation in response to the first period P1' being greater than the period T of the BGMS operation.

According to an embodiment of the present disclosure, the sequential area corresponding to the open command received at the time point t2 may not be a target of the BGMS operation at the time point t3 when the period T has elapsed from the time point t1, but at the time point t4, the sequential area corresponding to the open command may become the target of the BGMS operation.

Figure 8:
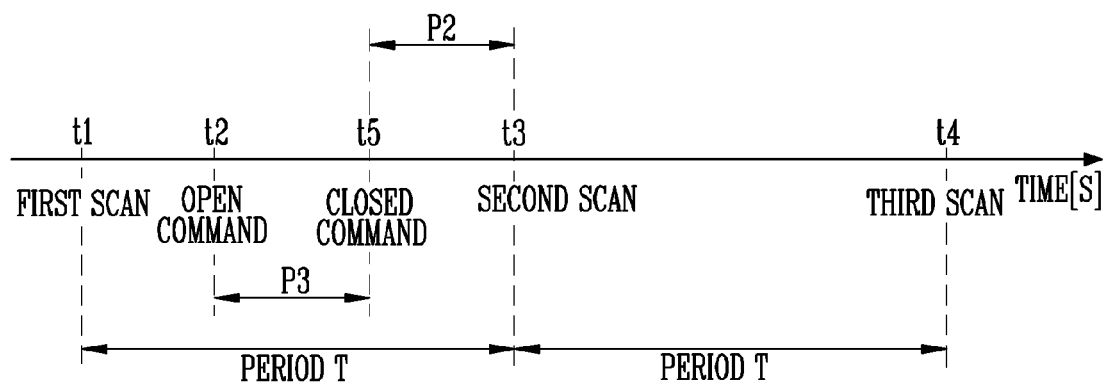
FIG. 8 illustrates a process for performing a BGMS operation after reception of a closed command according to an embodiment of the present disclosure.

FIG. 8 is a diagram illustrating a process for performing a BGMS operation after reception of a closed command according to an embodiment of the present disclosure.

Referring to FIG. 8, after the open command is received, the closed command may be received at a time point t5. A case where the memory controller 200 receives the closed command between the time point t2 and the time point t3 is illustrated. FIG. 8 may be the same as FIG. 7 except that the closed command is received at the time point t5.

In response to the reception of the closed command after the open command is received, the memory controller 200 may determine whether the sequential area is a skip area for which the BGMS operation is skipped, based on a second period P2 which is a period between the time point t5 and the time point t3 and a third period P3 which is a period between the time point t2 and the time point t5.

At the time point t3, the memory controller 200 may calculate the second period P2 and the third period P3. The memory controller 200 may calculate the second period P2 and the third period P3 using the clock signal inside the memory controller 200.

The scan area manager 210 may compare the second period P2 and the third period P3 with the period T of the BGMS operation. The scan area manager 210 may determine the sequential area corresponding to the closed command as the skip area in response to both the second period P2 and the third period P3 being less than the period T of the BGMS operation. That is, in the example of FIG. 8, the BGMS operation may not be performed on the sequential area corresponding to the closed command received at the time point t5 when the second scan operation is performed at the time point t3.

At the time point t4, the memory device 100 may perform the third scan. The memory controller 200 may calculate a fourth period (not shown) which is a period between the time point t5 and the time point t4. Since the fourth period is greater than the period T of the BGMS operation, at the time point t4, the memory device 100 may perform the BGMS operation on the sequential area corresponding to the closed command received at the time point t5.

In an embodiment of the present disclosure, when both the first time information corresponding to a time at which the open command was received and the second time information corresponding to a time at which the closed command was received are stored in the meta buffer 220, the memory controller 200 may determine the skip area among the plurality of sequential areas based on a time elapsed since the closed command was received, such as the second period P2, and a time between the open command and the closed command, such as the third period P3, rather than a time elapsed since the open command was received, such as the first period P1 shown in FIG. 7.

Figure 9:
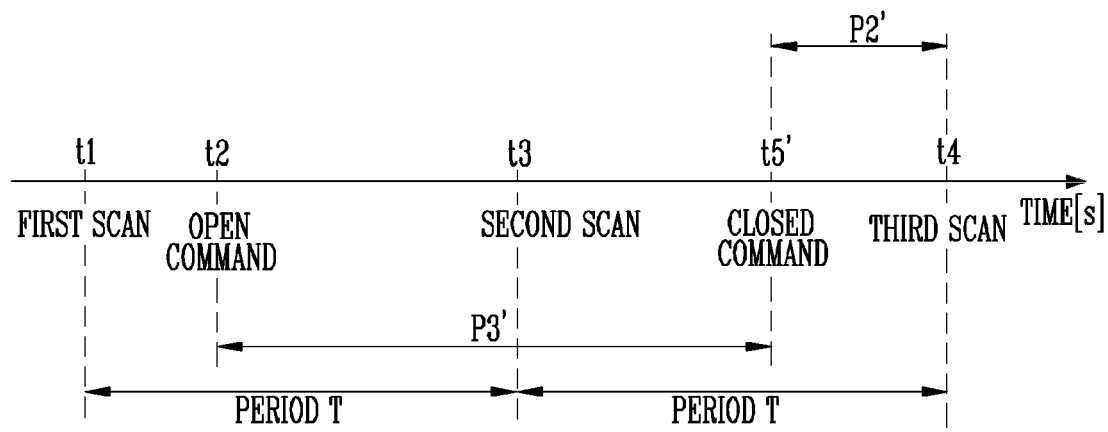
FIG. 9 illustrates a process for performing a BGMS operation after reception of a closed command according to another embodiment of the present disclosure.

FIG. 9 is a diagram illustrating a process for performing a BGMS operation after reception of a closed command according to another embodiment of the present disclosure.

Referring to FIG. 9, the closed command may be received between the time point t3 and the time point t4. In FIG. 9, the reception time point of the closed command may be different from that of FIG. 8. The memory controller 200 may receive the closed command at a time point t5'.

In FIG. 9, only the open command may be received until the time point t3 when the memory device 100 performs the second scan. At the time point t3, the BGMS operation on the sequential area corresponding to the open command may be skipped, as discussed with respect to FIG. 7. The closed command may be received at the time point t5' between the time point t3 and the time point t4.

The memory controller 200 may calculate a second period P2' which is a period between the time point t5' and the time point t4 and a third period P3' which is a period between the time point t2 and the time point t5'. The memory controller 200 may calculate the second period P2' and the third period P3' by using the clock signal inside the memory controller 200.

The scan area manager 210 may compare the second period P2' and the third period P3' with the period T of the BGMS operation. In FIG. 9, at the time point t5', the second period P2' may be less than the period T of the BGMS operation, but the third period P3' may be greater than the period T of the BGMS operation.

The scan area manager 210 may determine the sequential area corresponding to the closed command as the target area in response to the third period P3' being greater than the period T of the BGMS operation. That is, in this case, when the third scan operation is performed at the time point t4, the BGMS operation may be performed on the sequential area corresponding to the closed command received at the time point t5'.

Conversely, in FIG. 9, the third period P3' may be less than the period T of the BGMS operation. In that case, the scan area manager 210 determines the sequential area corresponding to the closed command as the skip area in response to the third period P3' being less than the period T of the BGMS operation. That is, in this case, when the third scan operation is performed, the BGMS operation may not be performed on the sequential area corresponding to the closed command received at the time point t5'.

Figure 10:
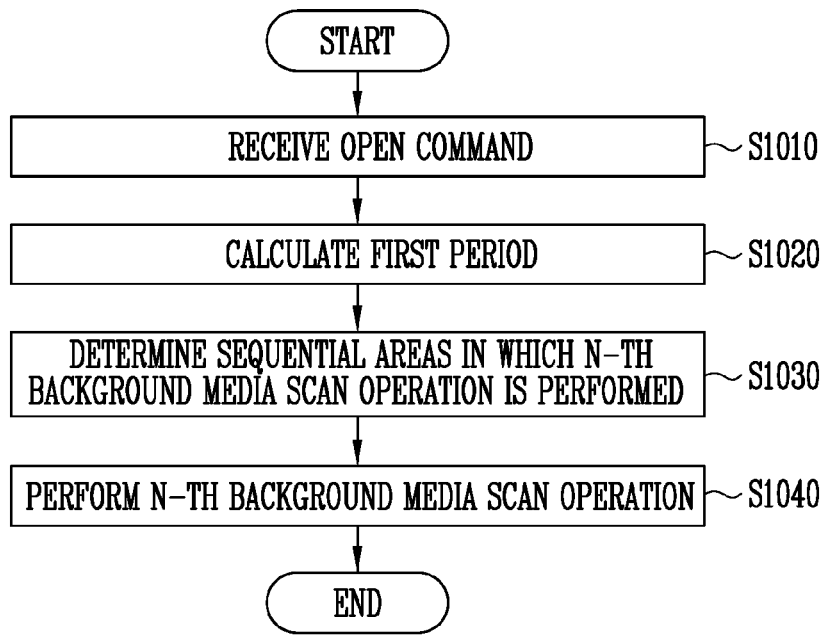
FIG. 10 is a flowchart illustrating a process for performing a BGMS operation according to an embodiment of the present disclosure.

FIG. 10 is a flowchart illustrating a process for performing a BGMS operation according to an embodiment of the present disclosure.

Referring to FIG. 10, the memory controller 200 may determine the sequential area in which the BGMS operation is performed in response to the open command received from the host 300. The memory device 100 may perform the BGMS operation according to the determination of the memory controller 200.

In step S1010, the memory controller 200 may receive the open command for allocating a buffer to any one sequential area among the plurality of sequential areas from the host 300. The open command may include first time information corresponding to a time at which the open command is received by the memory controller 200. The first time information may be stored at a predetermined position of the signal transmitting the open command.

In step S1020, the memory controller 200 may calculate the first period which is the period between the time point when the open command is received and the time point when the N-th BGMS operation is to be performed, based on the first time information. A process for calculating the first period may correspond to the description of FIG. 7.

In step S1030, the memory controller 200 may determine the sequential areas in which the N-th BGMS operation is performed among the plurality of sequential areas based on the first period. The memory controller 200 may compare the first period with the period of the BGMS operation.

In an embodiment of the present disclosure, the memory controller 200 may determine the skip area in which the BGMS operation is skipped among the plurality of sequential areas for each period of the BGMS operation based on the first period. In another embodiment of the present disclosure, the memory controller 200 may determine whether to perform the N-th BGMS operation on the sequential area corresponding to the open command based on the first period.

In step S1040, the memory device 100 may perform the N-th BGMS operation on the determined sequential areas.

The BGMS operation of the memory device 100 may correspond to the description of FIGS. 1 and 6.

Figure 11:
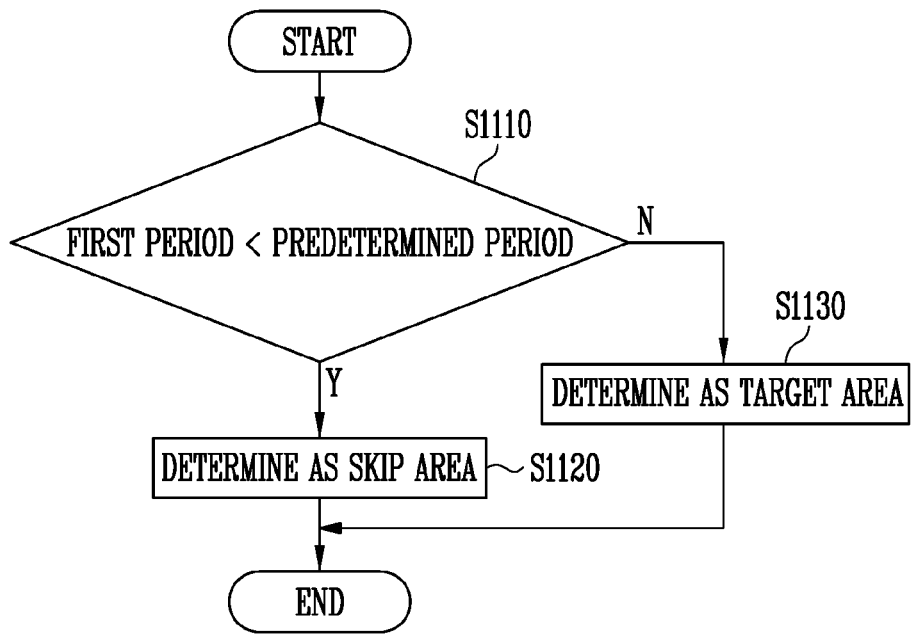
FIG. 11 is a flowchart illustrating a process for determining a sequential area in which a BGMS operation is performed according to an embodiment of the present disclosure.

FIG. 11 is a flowchart illustrating a process for determining a sequential area in which a BGMS operation is performed according to an embodiment of the present disclosure.

Referring to FIG. 11, the scan area manager 210 may divide the plurality of sequential areas into one or more skip areas and one or more target areas by comparing a first period with the period of the BGMS operation. In an embodiment, divide the plurality of sequential areas into skip areas and target areas includes comparing the period of the BGMS operation to respective first periods of the plurality of sequential areas.

In step S1110, the scan area manager 210 may compare the first period with the period of the BGMS operation. The period of the BGMS operation may be a predetermined value. The first period may be calculated as described in step S1020 of FIG. 10.

In step S1120, the scan area manager 210 may determine the sequential area corresponding to the open command as the skip area in which the N-th BGMS operation is skipped in response to the first period being less than the period in which the BGMS is performed. In step S1130, the scan area manager 210 may determine the sequential area corresponding to the open command as the target area in which the N-th BGMS operation is performed in response to the first period being greater than or equal to the period in which the BGMS is performed.

FIG. 12 is a flowchart illustrating a process for performing a BGMS operation according to another embodiment of the present disclosure.

Referring to FIG. 12, the memory controller 200 may determine the sequential area in which the BGMS operation is performed in consideration of an open command and a closed command received from the host 300. The memory device 100 may perform the BGMS operation according to the determination of the memory controller 200.

In step S1210, the memory controller 200 may receive the open command for allocating a buffer to any one sequential area among the plurality of sequential areas from the host 300. The open command may include first time information corresponding to a time at which the open command is received by the memory controller 200. The first time information may be stored at a predetermined position of the signal transmitting the open command.

In step S1220, the memory controller 200 may receive the closed command for releasing the buffer allocated to any one sequential area among the plurality of sequential areas from the host 300. The closed command may include second time information corresponding to a time at which the closed command is received by the memory controller 200. The second time information may be stored at a predetermined position of the signal transmitting the closed command.

In step S1230, the memory controller 200 may calculate, based on the first time information and the second time information, a second period which is the period between the time point when the closed command is received and the time point when the N-th BGMS operation is performed and a third period which is the period between the time point when the open command is received and the time point when the closed command is received. A process for calculating the second period and the third period may correspond to the description of FIGS. 8 and 9.

In step S1240, the memory controller 200 may determine whether to perform the N-th BGMS operation on the sequential area corresponding to the closed command based on the second period and the third period. The memory controller 200 may compare the second period with the period of the BGMS operation. The memory controller 200 may compare the third period with the period of the BGMS operation.

In step S1250, the memory device 100 may perform the N-th BGMS operation on the sequential area for which it was determined at step S1240 to perform the BGMS operation. Step S1250 may correspond to step S1040 of FIG. 10.

FIG. 13 is a flowchart illustrating a process for determining a sequential area in which a BGMS operation is performed according to another embodiment of the present disclosure.

Referring to FIG. 13, the scan area manager 210 may divide the plurality of sequential areas into one or more skip areas and one or more target areas by comparing the second period and the third period with the period of the BGMS operation. In an embodiment, divide the plurality of sequential areas into skip areas and target areas includes comparing the period of the BGMS operation to respective second and third periods of the plurality of sequential areas.

In step S1310, the scan area manager 210 may compare the second period with the period of the BGMS operation. The scan area manager 210 may compare the third period with the period of the BGMS operation. The period of the BGMS operation may be a predetermined value. The second period and the third period may be calculated in step S1230 of FIG. 12.

In step S1320, the scan area manager 210 may determine the sequential area corresponding to the closed command as the skip area in which the N-th BGMS operation is skipped in response to both of the second period and the third period being less than the period of the BGMS operation. In step S1330, the scan area manager 210 may determine the sequential area corresponding to the closed command as the target area in which the N-th BGMS operation is performed in response to the second period or the third period being greater than or equal to the period in which the BGMS is performed. When any one of the second period and the third period is greater than or equal to the period of the BGMS operation, the sequential area corresponding to the closed command may be determined as the target area.

Figure 14:
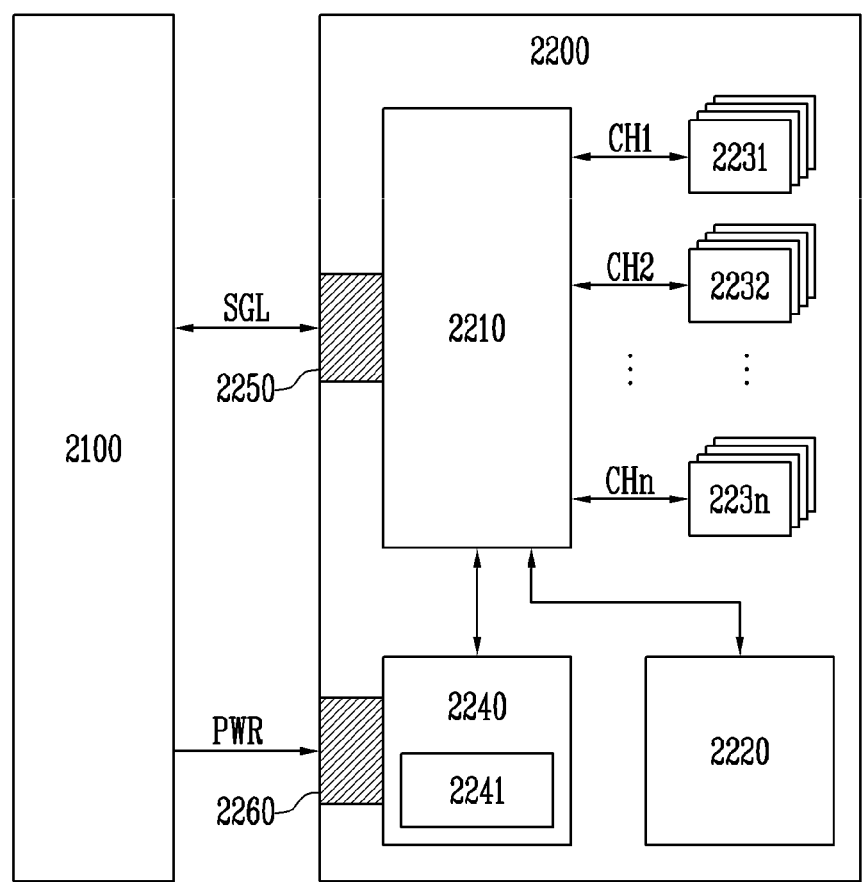
FIG. 14 illustrates an example of a data processing system including a solid state drive according to an embodiment of the present disclosure.

FIG. 14 is a diagram exemplarily illustrating a data processing system including a solid state drive (SSD) according to an embodiment of the present disclosure. Referring to FIG. 14, the data processing system 2000 may include a host device 2100 and an SSD 2200.

The SSD 2200 may include a controller 2210, a buffer memory device 2220, nonvolatile memories 2231 to 223n, a power supply 2240, a signal connector 2250, and a power connector 2260.

The controller 2210 may control an overall operation of the SSD 2200.

The buffer memory device 2220 may temporarily store data to be stored in the nonvolatile memories 2231 to 223n. In addition, the buffer memory device 2220 may temporarily store data read from the nonvolatile memories 2231 to 223n. The data temporarily stored in the buffer memory device 2220 may be transmitted to the host device 2100 or the nonvolatile memories 2231 to 223n under control of the controller 2210.

The nonvolatile memories 2231 to 223n may be used as a storage medium of the SSD 2200. Each of the nonvolatile memories 2231 to 223n may be connected to the controller 2210 through a plurality of channels CH1 to CHn. One or more nonvolatile memories may be connected to one channel. The nonvolatile memories connected to one channel may be connected to the same signal bus and data bus.

The power supply 2240 may provide power PWR input through the power connector 2260 into the SSD 2200. The power supply 2240 may include an auxiliary power supply 2241. The auxiliary power supply 2241 may supply power so that the SSD 2200 is normally ended when a sudden power off occurs. The auxiliary power supply 2241 may include large capacity capacitors capable of charging the power PWR.

The controller 2210 may exchange a signal SGL with the host device 2100 through the signal connector 2250. Here, the signal SGL may include a command, an address, data, and the like. The signal connector 2250 may be configured as various types of connectors according to an interface technology between the host device 2100 and the SSD 2200.

Figure 15:
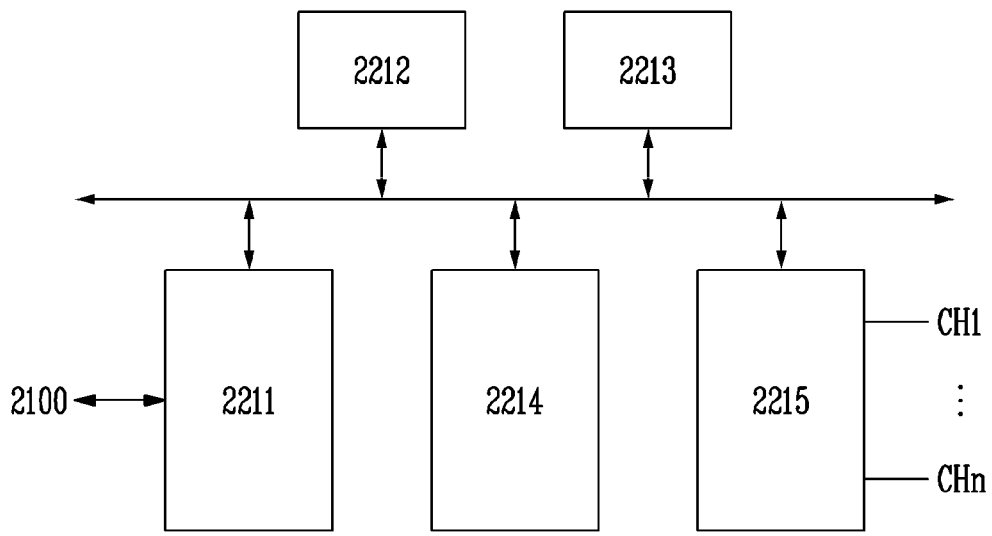
FIG. 15 illustrates an example of a configuration of the controller of FIG. 14.

FIG. 15 is a diagram exemplarily illustrating a configuration of the controller of FIG. 14. Referring to FIG. 15, the controller 2210 may include a host interface unit 2211, a control unit 2212, a random access memory 2213, an error correction code (ECC) unit 2214, and a memory interface unit 2215.

The host interface unit 2211 may interface the host device 2100 and the SSD 2200 according to a protocol of the host device 2100. For example, the host interface unit 2211 may communicate with the host device 2100 through any one of secure digital, universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), and universal flash storage (UFS) protocols. In addition, the host interface unit 2211 may perform a disk emulation function that supports the host device 2100 to recognize the SSD 2200 as a general-purpose data storage device, for example, a hard disk drive (HDD).

The control unit 2212 may analyze and process the signal SGL input from the host device 2100. The control unit 2212 may control an operation of internal functional blocks according to firmware or software for driving the SSD 2200. The random access memory 2213 may be used as an operation memory for driving such firmware or software.

The ECC unit 2214 may generate parity data of data to be transmitted to the nonvolatile memories 2231 to 223n. The generated parity data may be stored in the nonvolatile memories 2231 to 223n together with the data. The ECC unit 2214 may detect an error of data read from the nonvolatile memories 2231 to 223n based on the parity data. When the detected error is within a correction range, the ECC unit 2214 may correct the detected error.

The memory interface unit 2215 may provide a control signal such as a command and an address to the nonvolatile memories 2231 to 223n under control of the control unit 2212. In addition, the memory interface unit 2215 may exchange data with the nonvolatile memories 2231 to 223n under the control of the control unit 2212. For example, the memory interface unit 2215 may provide the data stored in the buffer memory device 2220 to the nonvolatile memories 2231 to 223n, or provide the data read from the nonvolatile memories 2231 to 223n to the buffer memory device 2220.

Figure 16:
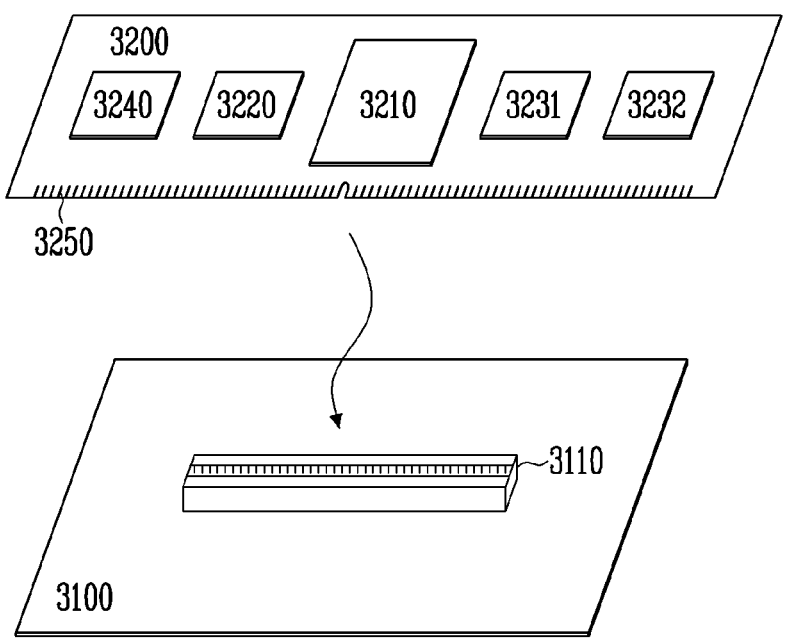
FIG. 16 illustrates an example of a data processing system including a data storage device according to an embodiment of the present disclosure.

FIG. 16 is a diagram exemplarily illustrating a data processing system including a data storage device according to an embodiment of the present disclosure. Referring to FIG. 16, the data processing system 3000 may include a host device 3100 and a data storage device 3200.

The host device 3100 may be configured in a form of a board such as a printed circuit board. Although not shown, the host device 3100 may include internal functional blocks for performing a function of the host device.

The host device 3100 may include a connection terminal 3110 such as a socket, a slot, or a connector. The data storage device 3200 may be mounted on the connection terminal 3110.

The data storage device 3200 may be configured in a form of a board such as a printed circuit board. The data storage device 3200 may be referred to as a memory module or a memory card. The data storage device 3200 may include a controller 3210, a buffer memory device 3220, nonvolatile memories 3231 to 3232, a power management integrated circuit (PMIC) 3240, and a connection terminal 3250.

The controller 3210 may control an overall operation of the data storage device 3200. The controller 3210 may be configured identically to the controller 2210 shown in FIG. 14.

The buffer memory device 3220 may temporarily store data to be stored in the nonvolatile memories 3231 to 3232. In addition, the buffer memory device 3220 may temporarily store data read from the nonvolatile memories 3231 to 3232. The data temporarily stored in the buffer memory device 3220 may be transmitted to the host device 3100 or the nonvolatile memories 3231 to 3232 under control of the controller 3210.

The nonvolatile memories 3231 to 3232 may be used as a storage medium of the data storage device 3200.

The PMIC 3240 may provide power input through the connection terminal 3250 into the data storage device 3200. The PMIC 3240 may manage the power of the data storage device 3200 according to the control of the controller 3210.

The connection terminal 3250 may be connected to the connection terminal 3110 of the host device. Power and a signal such as a command, an address, and data may be transmitted between the host device 3100 and the data storage device 3200 through the connection terminal 3250. The connection terminal 3250 may be configured as various types according to an interface technology between the host device 3100 and the data storage device 3200. The connection terminal 3250 may be disposed on any one side of the data storage device 3200.

Figure 17:
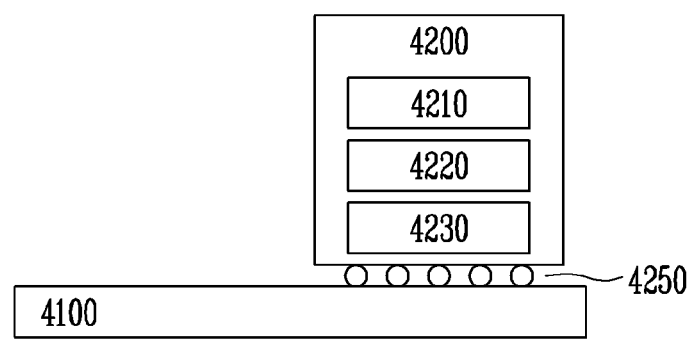
FIG. 17 illustrates an example of a data processing system including a data storage device according to an embodiment of the present disclosure.

FIG. 17 is a diagram exemplarily illustrating a data processing system including a data storage device according to an embodiment of the present disclosure. Referring to FIG. 17, the data processing system 4000 may include a host device 4100 and a data storage device 4200.

The host device 4100 may be configured in a form of a board such as a printed circuit board. Although not shown, the host device 4100 may include internal functional blocks for performing a function of the host device.

The data storage device 4200 may be configured in a form of a surface mounted package. The data storage device 4200 may be mounted on the host device 4100 through a solder ball 4250. The data storage device 4200 may include a controller 4210, a buffer memory device 4220, and a nonvolatile memory 4230.

The controller 4210 may control an overall operation of the data storage device 4200. The controller 4210 may be configured identically to the controller 2210 shown in FIG. 14.

The buffer memory device 4220 may temporarily store data to be stored in the nonvolatile memory 4230. In addition, the buffer memory device 4220 may temporarily store data read from the nonvolatile memories 4230. The data temporarily stored in the buffer memory device 4220 may be transmitted to the host device 4100 or the nonvolatile memory 4230 under control of the controller 4210.

The nonvolatile memory 4230 may be used as a storage medium of the data storage device 4200.

Figure 18:
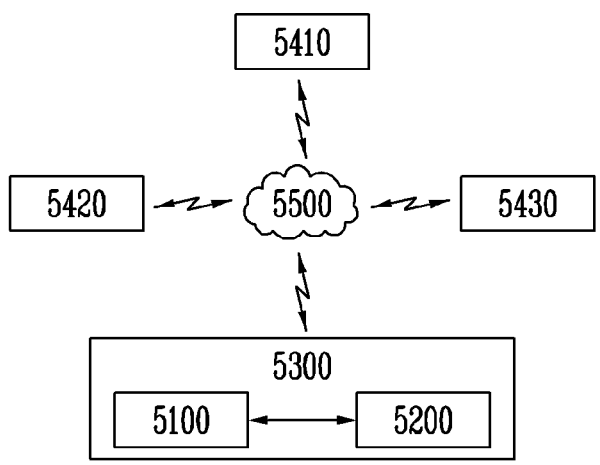
FIG. 18 illustrates an example of a network system including a data storage device according to an embodiment of the present disclosure.

FIG. 18 is a diagram exemplarily illustrating a network system including a data storage device according to an embodiment of the present disclosure. Referring to FIG. 18, the network system 5000 may include a server system 5300 and a plurality of client systems 5410 to 5430 connected through a network 5500.

The server system 5300 may service data in response to a request of the plurality of client systems 5410 to 5430. For example, the server system 5300 may store data provided from the plurality of client systems 5410 to 5430. As another example, the server system 5300 may provide data to the plurality of client systems 5410 to 5430.

The server system 5300 may include a host device 5100 and a data storage device 5200. The data storage device 5200 may include the memory system 50 of FIG. 1, the SSD 2200 of FIG. 14, the data storage device 3200 of FIG. 16, and the data storage device 4200 of FIG. 17.

Since the present disclosure may be implemented in other specific forms without changing the technical spirit or essential features thereof, those of ordinary skill in the art to which the present disclosure pertains should understand that the embodiments described above are illustrative and are not limited in all aspects. The scope of the present disclosure is indicated by the claims to be described later rather than the detailed description, and all changes or modifications derived from the meaning and scope of the claims and their equivalent concepts are interpreted as being included in the scope of the present disclosure.

What is claimed is:

1. A memory system comprising:
   a memory device including a plurality of sequential areas in which data corresponding to consecutive logical addresses provided by a host are respectively stored, and configured to perform a background media scan (BGMS) operation on one or more sequential areas among the plurality of sequential areas during one or more BGMS operation periods each having a predetermined period; and
   a memory controller configured to:
      receive from the host an open command for allocating a buffer to a sequential area among the plurality of sequential areas, wherein first time information corresponds to a time point when the open command is received by the memory controller,
      calculate, based on the first time information, a first period which is a period between the time point when the open command is received and a time point when a BGMS operation period begins, and
      determine, based on the first period, a skip area from among the plurality of sequential areas, the skip area being a sequential area for which the BGMS operation is skipped during the BGMS operation period.

2. The memory system of claim 1, wherein determining the skip area includes: determining a sequential area corresponding to the open command among the plurality of sequential areas as the skip area in response to the first period being less than the predetermined period.

3. The memory system of claim 2, wherein determining the skip area includes: in response to the first period being greater than or equal to the predetermined period, determining the sequential area corresponding to the open command as a target area on which the BGMS operation is performed.

4. The memory system of claim 1, wherein the memory controller is further configured to:
   receive a closed command for releasing the buffer allocated to the sequential area from the host, wherein second time information corresponds to a time at which the closed command is received by the memory controller,
   calculate, based on the first time information and the second time information, a second period which is a period between a time point when the closed command is received and the time point when the BGMS operation period begins and a third period which is a period between the time point when the open command is received and the time point when the closed command is received, and
   determine the skip area among the plurality of sequential areas based on the second period and the third period.

5. The memory system of claim 4, wherein determining the skip area includes determining the sequential area corresponding to the closed command as the skip area in response to the second period and the third period being less than the predetermined period.

6. The memory system of claim 5, wherein determining the skip area includes determining, in response to the second period, the third period, or both being greater than or equal to the predetermined period, the sequential area corresponding to the closed command as a target area on which the BGMS operation is performed.

7. The memory system of claim 1, wherein the first time information is included in the open command.

8. A memory system comprising:
   a memory device including a plurality of sequential areas in which data corresponding to consecutive logical addresses provided by a host are stored, respectively, and configured to selectively perform a background media scan (BGMS) operation on the plurality of sequential areas during one or more BGMS operation periods each having a predetermined period; and
   a memory controller configured to:
      receive an open command for allocating a buffer to a sequential area among the plurality of sequential areas from the host, wherein first time information corresponds to a time at which the open command is received by the memory controller,
      calculate, based on the first time information, a first period which is a period between a time point when the open command is received and a time point when an N-th BGMS operation period begins, where N is greater than or equal to 1, and
      determine, based on the first period, whether to perform a BGMS operation on a sequential area corresponding to the open command during the N-th BGMS operation period.

9. The memory system of claim 8, wherein determining whether to perform the BGMS operation on the sequential area corresponding to the open command during the N-th BGMS operation period includes determining not to perform the BGMS operation during the N-th BGMS operation period in response to the first period being less than the predetermined period.

10. The memory system of claim 9, wherein determining whether to perform the BGMS operation on the sequential area corresponding to the open command during the N-th BGMS operation period includes determining to perform the BGMS operation during the N-th BGMS operation period in response to the first period being greater than or equal to the period.

11. The memory system of claim 10, wherein the memory controller is further configured to:
receive a closed command for releasing the buffer allocated to the any one sequential area from the host, wherein second time information corresponds to a time at which the closed command is received by the memory controller, and
calculate, based on the first time information and the second time information, a second period which is a period between a time point when the closed command is received and the time point when the N-th BGMS operation period begins and a third period which is a period between the time point when the open command is received and the time point when the closed command is received, and
determine, based on the second period and the third period, whether to perform a BGMS operation on a sequential area corresponding to the closed command during the N-th BGMS operation period.

12. The memory system of claim 11, wherein determining whether to perform the BGMS operation on the sequential area corresponding to the closed command during the N-th BGMS operation period includes determining to skip the BGMS operation in response to the second period and the third period being less than the predetermined period.

13. The memory system of claim 12, wherein determining whether to perform the BGMS operation on the sequential area corresponding to the closed command during the N-th BGMS operation period includes determining to perform the BGMS operation in response to the second period, the third period, or both being greater than or equal to the predetermined period.

14. The memory system of claim 8, wherein the first time information is included in the open command.

15. A method of operating a memory system comprising a memory device including a plurality of sequential areas in which data corresponding to consecutive logical addresses are respectively stored, and a memory controller configured to control the memory device to selectively perform a background media scan (BGMS) operation on the plurality of sequential areas for each of a plurality of BGMS periods each having a predetermined period, the method comprising:
receiving an open command for allocating a buffer to a sequential area among the plurality of sequential areas, wherein first time information corresponds to a time at which the open command is received;
calculating, based on the first time information, a first period which is a period between a time point when the open command is received and a time point corresponding to a start of an N-th BGMS period, where N is greater than or equal to 1;
determining, based on the first period, one or more sequential areas on which BGMS operations are to be performed during the N-th BGMS period from among the plurality of sequential areas; and
performing BGMS operations on the determined one or more sequential areas during the N-th BGMS period.

16. The method of claim 15, wherein determining the one or more sequential areas on which the BGMS operations are to be performed during the N-th BGMS period comprises determining the sequential area corresponding to the open command as a skip area for which the BGMS operation is skipped during the N-th BGMS period in response to the first period being shorter than the predetermined period.

17. The method of claim 16, wherein determining the one or more sequential areas on which the BGMS operations are to be performed during the N-th BGMS period comprises determining the sequential area corresponding to the open command as a target area on which the BGMS operation is performed during the N-th BGMS period in response to the first period being greater than or equal to the predetermined period.

18. The method of claim 17, further comprising:
receiving a closed command for releasing the buffer allocated to the sequential area, wherein second time information corresponds to a time at which the closed command is received by the memory controller;
calculating, based on the first time information and the second time information, a second period which is a period between a time point when the closed command is received and the time point corresponding to a start of the N-th BGMS period and a third period which is a period between the time point when the open command is received and the time point when the closed command is received; and
determining, based on the second period and the third period, whether to perform a BGMS operation on a sequential area corresponding to the closed command during the N-th BGMS period.

19. The method of claim 18, wherein determining whether to perform the BGMS operation during the N-th BGMS period comprises determining the sequential area corresponding to the closed command as the skip area on which the BGMS operation during the N-th BGMS period is skipped in response to the second period and the third period being less than the predetermined period.

20. The method of claim 19, wherein determining whether to perform the BGMS operation during the N-th BGMS period comprises determining the sequential area corresponding to the closed command as the target area on which the BGMS operation during the N-th BGMS period is performed in response to the second period, the third period, or both being greater than or equal to the predetermined period.

* * * * *